United States Patent
Park et al.

(10) Patent No.: US 9,835,907 B2
(45) Date of Patent: Dec. 5, 2017

(54) LIQUID CRYSTAL DISPLAY DEVICE

(71) Applicant: Samsung Display Co., Ltd., Yongin-si (KR)

(72) Inventors: Je Hyeong Park, Seoul (KR); Swae-Hyun Kim, Asan-si (KR); Seung Ho Yang, Hwaseong-si (KR); Jun Seok Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 59 days.

(21) Appl. No.: 14/858,199

(22) Filed: Sep. 18, 2015

(65) Prior Publication Data

US 2016/0202543 A1    Jul. 14, 2016

(30) Foreign Application Priority Data

Jan. 14, 2015  (KR) ......................... 10-2015-0007003

(51) Int. Cl.
*G02F 1/1362* (2006.01)
*G02F 1/1335* (2006.01)
(Continued)

(52) U.S. Cl.
CPC .... *G02F 1/13394* (2013.01); *G02F 1/136209* (2013.01); *G02F 2001/13396* (2013.01);
(Continued)

(58) Field of Classification Search
CPC ......... G02F 1/136209; G02F 1/133512; G02F 1/133514; G02F 2001/136222;
(Continued)

(56) References Cited

U.S. PATENT DOCUMENTS 5,708,485 A * 1/1998 Sato .................. G02F 1/136209
349/110
8,553,183 B2  10/2013 Kim et al.
(Continued)

FOREIGN PATENT DOCUMENTS

KR    10-2007-0082750    8/2007
KR    10-2008-0062641    7/2008
(Continued)

*Primary Examiner* — Jia Pan
(74) *Attorney, Agent, or Firm* — H.C. Park & Associates, PLC

(57) ABSTRACT

A liquid crystal display device includes: a first substrate including a first light blocking region, wherein a plurality of transistors are formed in the first light blocking region; a second substrate facing the first substrate, the second substrate including a common electrode disposed thereon; and a liquid crystal layer interposed between the first substrate and the second substrate, wherein the first substrate includes: a data line disposed extending in a vertical direction; color filters, each of the color filters overlapping adjacent color filters to form a color filter overlapping portion in boundary regions of the color filters in a vertical direction; and a light blocking member disposed extending in a horizontal direction covering the first light blocking region, wherein the data line and the color filter overlapping portion are spaced apart from each other in a horizontal direction in a region where the light blocking member is formed.

9 Claims, 13 Drawing Sheets

(51) Int. Cl.
*G02F 1/1343* (2006.01)
*G02F 1/1339* (2006.01)

(52) U.S. Cl.
CPC .............. *G02F 2001/13398* (2013.01); *G02F 2001/134345* (2013.01); *G02F 2001/136218* (2013.01); *G02F 2001/136222* (2013.01)

(58) Field of Classification Search
CPC ... G02F 2001/136218; G02F 1/136286; G02F 2001/13396; G02F 1/13394; G02F 2001/13398
See application file for complete search history.

(56) References Cited

U.S. PATENT DOCUMENTS

| | | |
|---|---|---|
| 8,767,147 B2 | 7/2014 | Yang et al. |
| 2009/0225017 A1* | 9/2009 | Kim .................. G02F 1/133514 345/88 |
| 2012/0249940 A1* | 10/2012 | Choi ................. G02F 1/133753 349/123 |

FOREIGN PATENT DOCUMENTS

| | | |
|---|---|---|
| KR | 10-2009-0096227 | 9/2009 |
| KR | 10-2011-0038477 | 4/2011 |
| KR | 10-2011-0076369 | 7/2011 |

\* cited by examiner

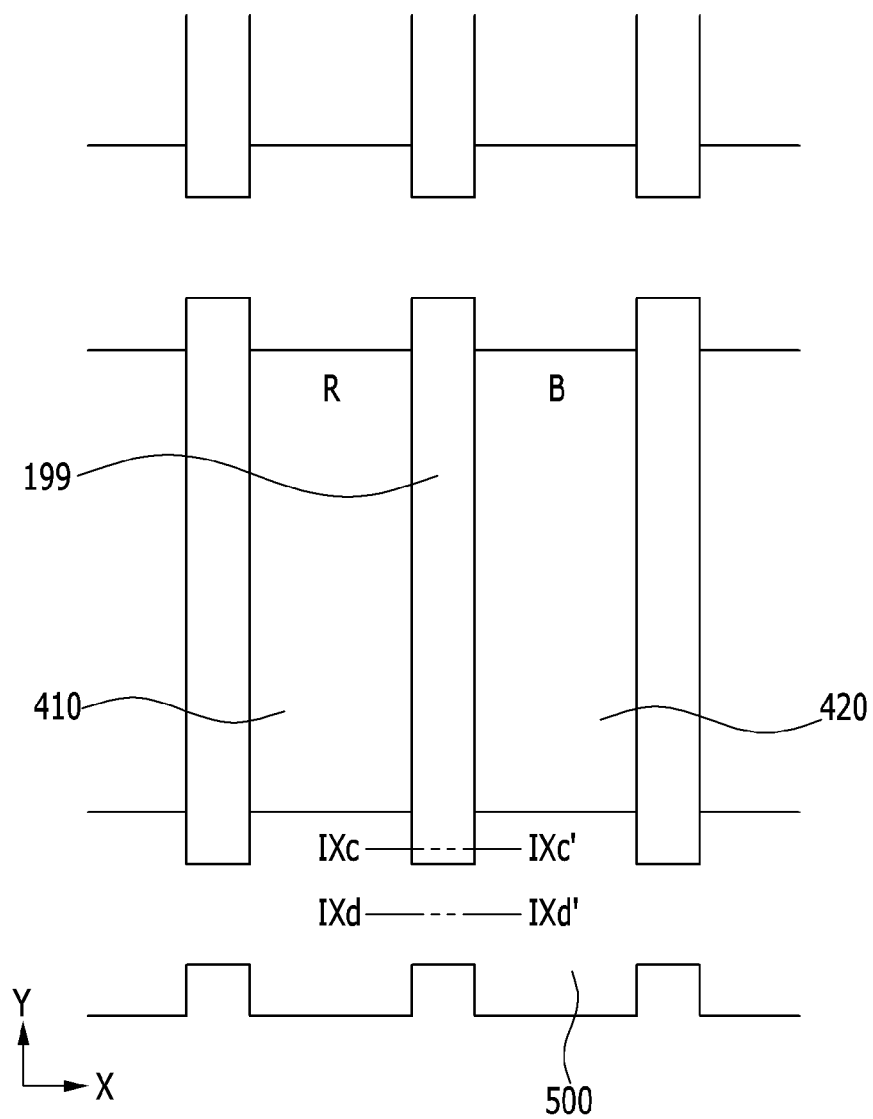

LIQUID CRYSTAL DISPLAY DEVICE

CROSS-REFERENCE TO RELATED APPLICATION

This application claims priority from and the benefit of Korean Patent Application No. 10-2015-0007003, filed on Jan. 14, 2015, which is hereby incorporated by reference for all purposes as if fully set forth herein.

BACKGROUND

Field

Exemplary embodiments relate to a liquid crystal display device.

Discussion of the Background

A liquid crystal display device is a type of flat panel display device that is formed of two substrates on which electrodes are formed, and a liquid crystal layer is inserted therebetween. The liquid crystal display device may adjust an amount of transmitted light by applying a voltage to the electrodes to rearrange liquid crystal molecules of the liquid crystal layer.

The liquid crystal display device may have a structure in which an electric field generating electrode is formed on each of the two substrates. A plurality of thin film transistors and a pixel electrode may be arranged in a matrix form on a first substrate (lower panel, a display panel of a thin film transistor), and red, green, and blue color filters may be formed on the second substrate (upper panel, a common electrode display panel), and a common electrode may be disposed covers the entire surface of the second substrate.

However, by disposing the pixel electrode and the color filters on different substrates in the liquid crystal display device as described above, the pixel electrode and the color filters may not be accurately aligned with respect to each other and cause an alignment error. To solve this, a color filter on array (or COA), a structure in which the color filters and the pixel electrode are formed on the same substrate, has been suggested.

Also, considering an adhesion margin when adhering a first substrate and a second substrate, a light blocking member such as a black matrix may have a relatively greater size. However, an aperture ratio may be decreased due to the increased size of the black matrix, and thus, the black matrix may be formed on the first substrate.

A cell gap, which refers to a gap between liquid crystal layers between the two substrates, may affect the overall operating characteristics of the liquid crystal display device such as a response speed, a contrast ratio, an angle of view, luminance uniformity, and the like. If the cell gap is not uniform, a uniform image may not be displayed over the entire screen and cause image quality defects. Thus, in order to maintain a uniform cell gap over the entire region on the substrates, a plurality of spacers are formed on at least one of the two substrates.

The plurality of spacers may include a main column spacer that substantially supports the two substrates and a sub-column spacer assisting the function of the main column spacer.

For process simplification, a light blocking member such as a black matrix and a spacer may be simultaneously formed. The light blocking member, the main column spacer, and the sub-column spacer may be simultaneously formed by forming multiple step differences.

Generally, a step difference between a main column spacer and a sub-column spacer formed may be about 0.5 µm. A uniform density ratio of column spacers may provide a process margin against active unfilled area (AUA) defects during a liquid crystal process.

A step protruding having a height equivalent to the height of the column spacers in regions of other than the main column spacer and the sub-column spacer may function as a sub-column spacer, resulting in a change in the entire density of the main column spacer and the sub-column spacer. This may cause a problem in a liquid crystal margin at a low temperature.

Thus, a liquid crystal display device capable of providing a uniform density of spacers is required.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a liquid crystal display device configured to reduce or prevent light leakage and include spacers having a uniform density.

Additional aspects will be set forth in the detailed description which follows, and, in part, will be apparent from the disclosure, or may be learned by practice of the inventive concept.

According to exemplary embodiments, a liquid crystal display device includes: a first substrate including a first light blocking region, wherein a plurality of transistors are formed in the first light blocking region; a second substrate facing the first substrate, the second substrate including a common electrode disposed thereon; and a liquid crystal layer interposed between the first substrate and the second substrate, wherein the first substrate includes: a data line disposed extending in a vertical direction; color filters, each of the color filters overlapping adjacent color filters to form a color filter overlapping portion in boundary regions of the color filters in a vertical direction; and a light blocking member disposed extending in a horizontal direction covering the first light blocking region, wherein the data line and the color filter overlapping portion are spaced apart from each other in a horizontal direction in a region where the light blocking member is formed.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 7 illustrates light blocking members disposed on a first substrate.

DETAILED DESCRIPTION OF THE ILLUSTRATED EMBODIMENTS

Figure 1:
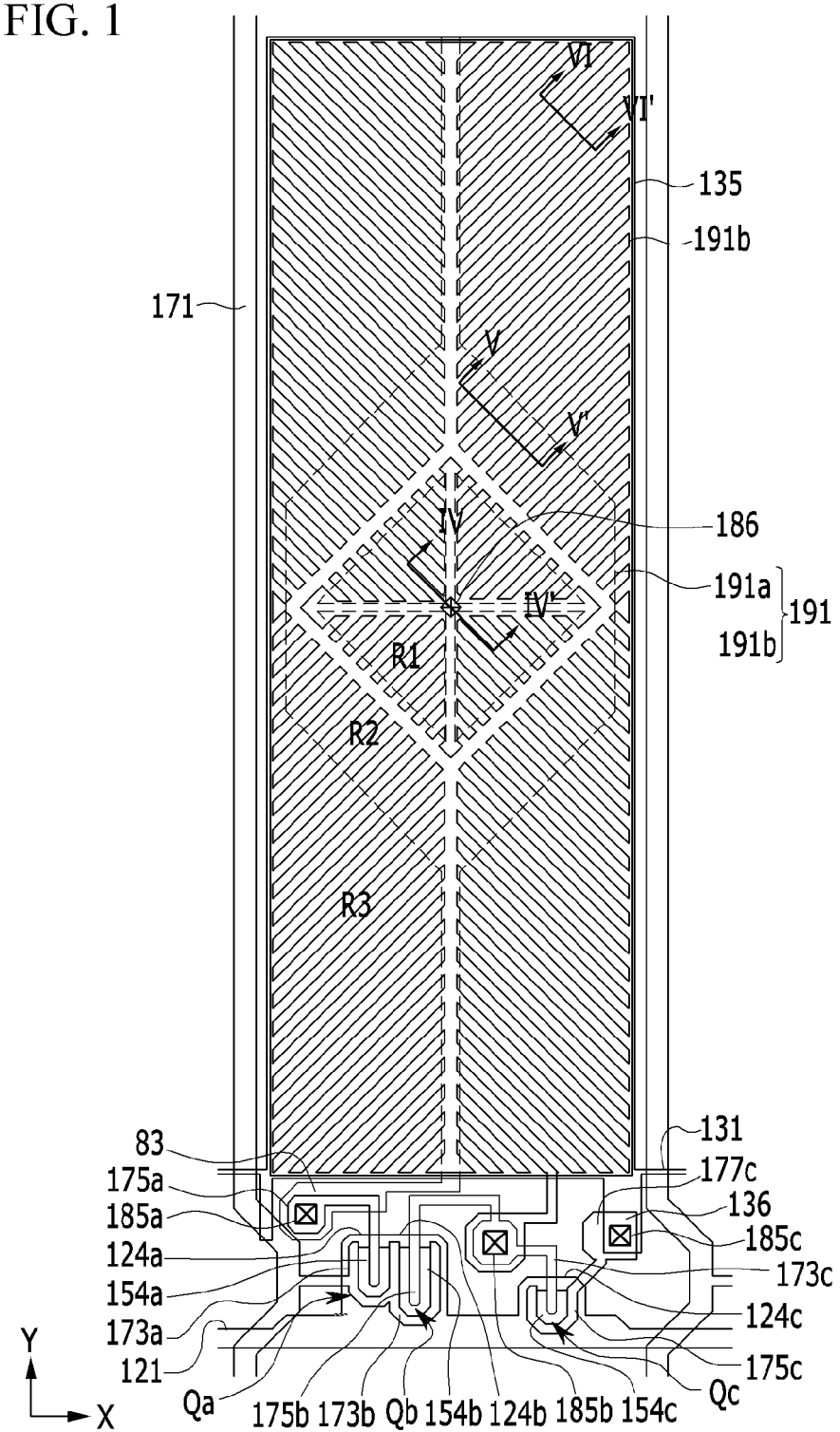
FIG. 1 is a top plan view of a pixel of a liquid crystal display device according to one or more exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 4:
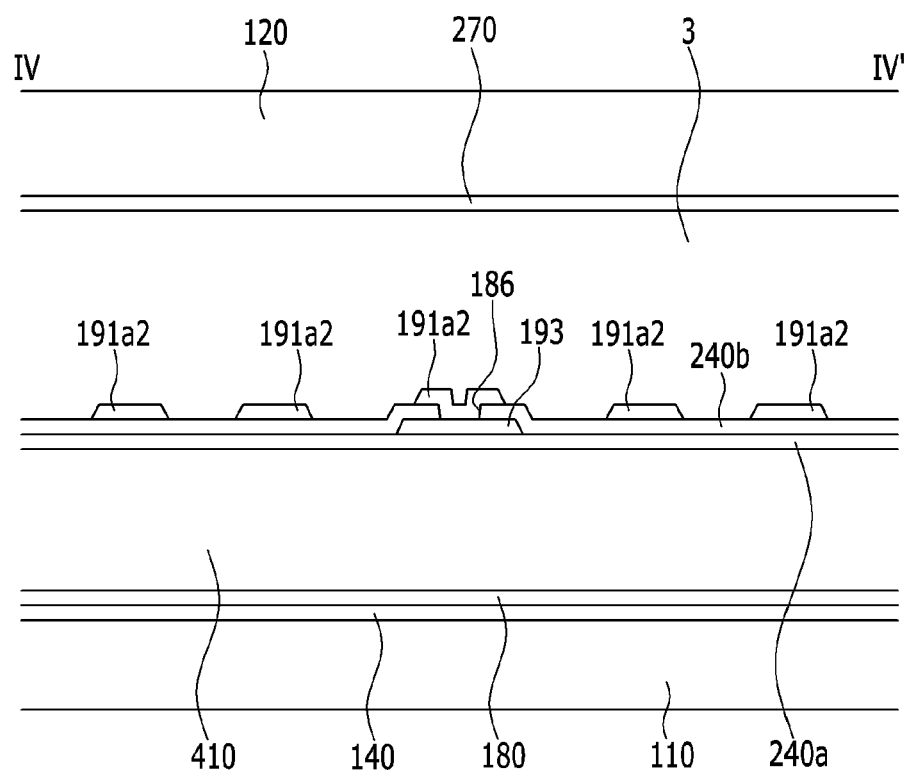
FIG. 4 is a cross-sectional view of the pixel taken along a sectional line IV-IV' of FIG. 1.
Figure 5:
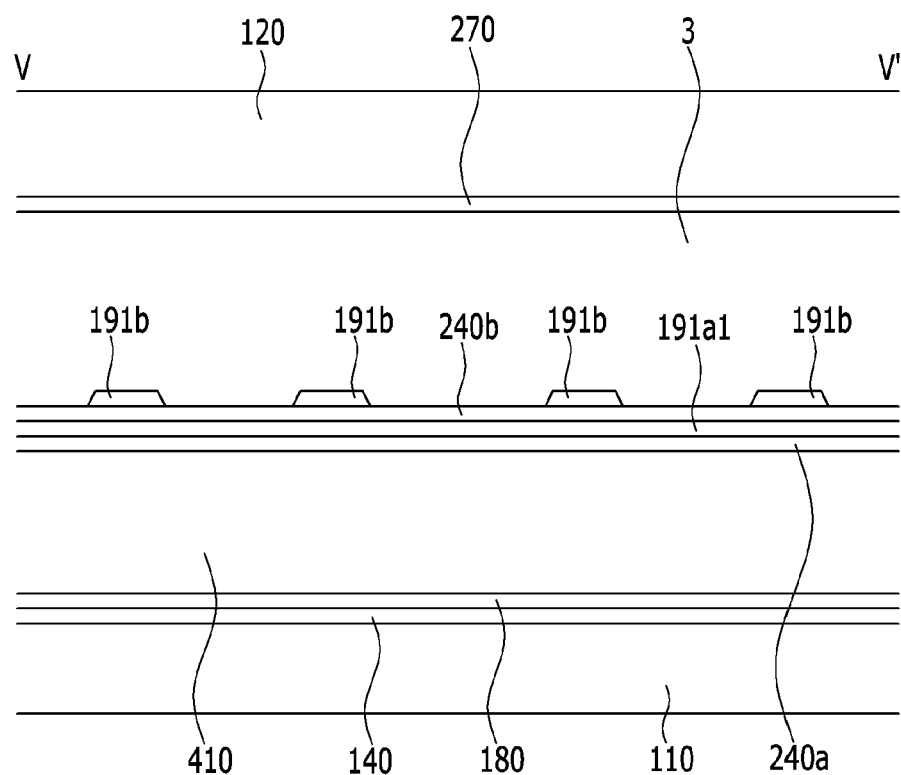
FIG. 5 is a cross-sectional view of the pixel taken along a sectional line V-V' of FIG. 1.
Figure 6:
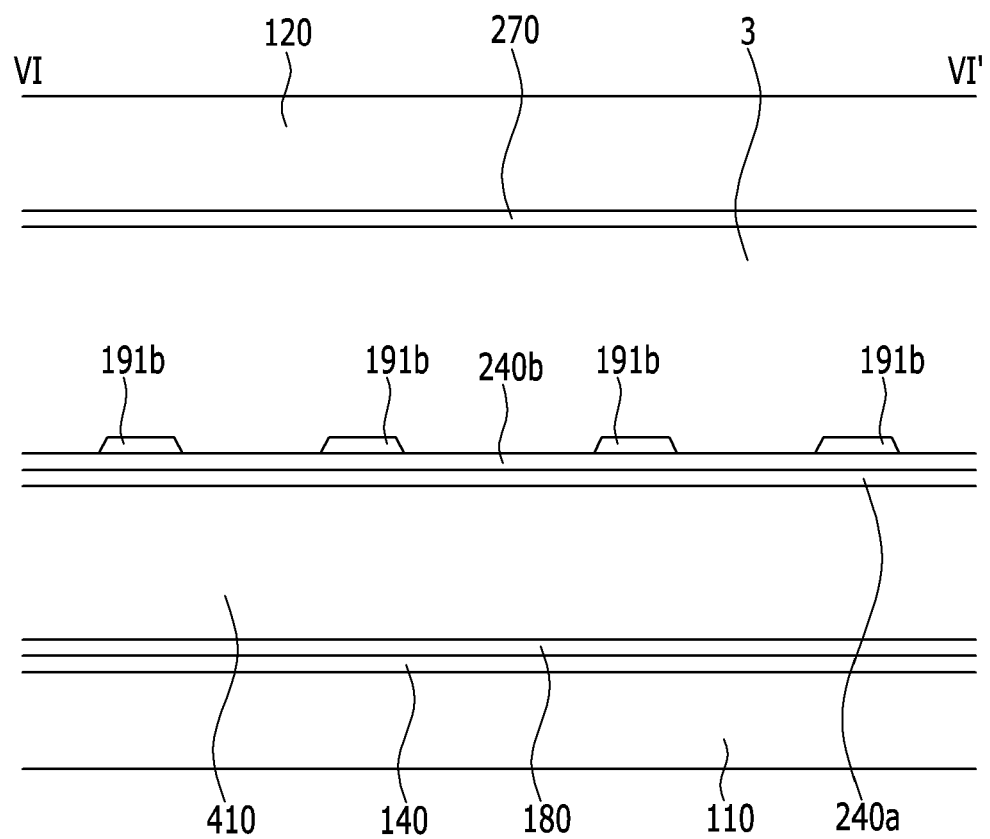
FIG. 6 is a cross-sectional view of the pixel taken along a sectional line VI-VI' of FIG. 1.

FIG. 1 is a top plan view of a pixel of a liquid crystal display device according to one or more exemplary embodiments. FIG. 4 is a cross-sectional view of the pixel taken along a sectional line IV-IV' of FIG. 1. FIG. 5 is a cross-sectional view of the pixel taken along a sectional line V-V' of FIG. 1. FIG. 6 is a cross-sectional view of the pixel taken along a sectional line VI-VI' of FIG. 1.

Referring to FIGS. 1, 4, 5, and 6, a gate line 121 and a reference voltage line 131 are disposed on a first substrate 110 formed of at least one of a transparent glass, a plastic and the like. The gate line 121 mainly extends in a horizontal direction X and is configured to transmit a gate signal.

The gate line 121 includes a first gate electrode 124a, a second gate electrode 124b, a third gate electrode 124c, and a broad end portion (not shown) for connection to other layers and/or an external driving circuit (not shown).

The first gate electrode 124a and the second gate electrode 124b are connected to each other to form a protrusion. The exemplary embodiments are not limited thereto, and the protrusion may have varied forms including the first, second, and third gate electrodes 124a, 124b, and 124c The reference voltage line 131 also mainly extends in the horizontal direction X and is configured to transmit a preset voltage such as a common voltage Vcom. The reference voltage line 131 may extend parallel to the gate line 121 and include an extension portion 136, and the extension portion 136 is connected to a third drain electrode 175c, which will be described later, via a fourth contact hole 185c.

A gate insulating layer 140 is disposed on the gate line 121, the reference voltage line 131, and the extension portion 136. The gate insulating layer 140 may be formed of an inorganic insulating material, including silicon nitride (SiNx), silicon oxide (SiOx), or the like. Also, the gate insulating layer 140 may be formed of a single layer or a multilayer.

A first semiconductor 154a, a second semiconductor 154b, and a third semiconductor 154c may be disposed on the gate insulating layer 140. The first semiconductor 154a may be disposed on the first gate electrode 124a, the second semiconductor 154b may be disposed on the second gate electrode 124b, and the third semiconductor 154c may be disposed on the third gate electrode 124c.

The first semiconductor 154a and the second semiconductor 154b may be connected to each other, and the second semiconductor 154b and the third semiconductor 154c may also be connected to each other. Also, the first semiconductor 154a may extend to a portion below the data line 171. Each of the first, second, and third semiconductors 154a, 154b, and 154c may be formed of amorphous silicon, polycrystalline silicon, metal oxide, or the like.

An ohmic contact (not shown) may be further formed on each of the first, second, and third semiconductors 154a, 154b, and 154c. The ohmic contact may be formed of a silicide and/or a material such as n+ hydrogenated amorphous silicon doped with an n-type impurity. If the first, second, and third semiconductor 154a, 154b, and 154c are oxide semiconductors, the ohmic contact may be omitted.

A data conductor including a data line 171, a first source electrode 173a and a second source electrode 173b, a third source electrode a first drain electrode 175a, a second drain electrode 175b, and a third drain electrode 175c is formed on the first, second, and third semiconductors 154a, 154b, and 154c. The second drain electrode 175b is connected to the third source electrode 173c.

The data line 171 is configured to transmit a data signal and mainly extends in a vertical direction Y crossing the gate line 121. Each data line 171 includes the first source electrode 173a and the second source electrode 173b respectively extending toward and connected to the first gate electrode 124a and the second gate electrode 124b.

The first drain electrode 175a, the second drain electrode 175b, and the third drain electrode 175c each include a broad end portion and a bar-shaped end portion. The bar-shaped end portions of the first drain electrode 175a and the second drain electrode 175b are respectively partially surrounded by the first source electrode 173a and the second source electrode 173b, respectively. The broad end portion of the second drain electrode 175b further extends to form the third source electrode 173c having an T shape. The broad end portion 177c of the third drain electrode 175c overlaps with the extension portion 136 to form a step-down capacitor Cstd.

Except for channel regions between the source electrodes 173a, 173b, and 173c and the drain electrodes 175a, 175b, and 175c, the data conductors 171, 173a, 173b, 173c, 175a, 175b, and 175c and ohmic contacts under the data conductors may have substantially the same planar shape.

The first gate electrode 124a, the first source electrode 173a, and the first drain electrode 175a form a first thin film transistor Qa with the first semiconductor 154a, and a channel of the first thin film transistor Qa is formed in the first semiconductor 154a between the first source electrode 173a and the first drain electrode 175a.

The second gate electrode 124b, the second source electrode 173b, and the second drain electrode 175b form the second thin film transistor Qb with the second semiconductor 154b, and a channel of the second thin film transistor Qb is formed in the second semiconductor 154b between the second source electrode 173b and the second drain electrode. The third gate electrode 124c, the third source electrode 173c, and the third drain electrode 175c form the third thin film transistor Qc with the third semiconductor 154c, and a channel of the third thin film transistor Qc is formed in the third semiconductor 154c between the third source electrode 173c and the third drain electrode 175c.

A passivation layer 180 may be formed of an inorganic insulating material such as a silicon nitride and/or a silicon oxide, and may be disposed on the data conductors 171, 173a, 173b, 173c, 175a, 175b, and 175c and exposed portions of the semiconductors 154a, 154b, and 154c. The passivation layer 180 may be formed of an organic insulating material or an inorganic insulating material, and of a single layer or a multilayer.

Color filters 410 and 420 are formed in each pixel area PX on the passivation layer 180. Each of the color filters 410 and 420 may be configured to display one of three primary colors among red 410, green (not shown), and blue 420. The color filters 410 and 420 are not limited to the three primary colors of the red 410, the green, and the blue 420, and may also display cyan, magenta, yellow, and white based colors. Although not illustrated in this manner in the drawings, the color filters 410 and 420 may extend in a column direction along space between adjacent data lines 171.

A first insulating layer 240a may be further disposed on the color filters 410 and 420. The first insulating layer 240a may be formed of an inorganic insulating material such as a silicon nitride (SiNx), a silicon oxide (SiOx), a silicon oxynitride (SiOxNy) or the like. The first insulating layer 240a may be configured to reduce or prevent lifting of the color filters 410 and 420 and may also be configured to reduce contamination of a liquid crystal layer due to an organic material such as a solvent from the color filters 410 and 420, thereby reducing or preventing defects such as afterimage generated when driving the liquid crystal display device.

A first sub-region 191a1 of a first sub-pixel electrode 191a and a shielding electrode 199 are disposed on the first insulating layer 240a.

Figure 2:
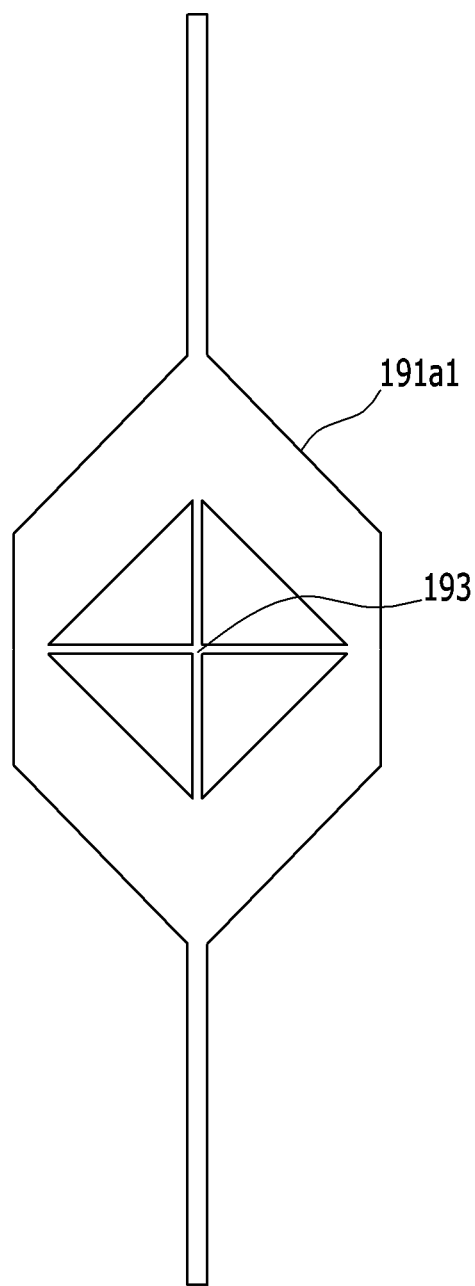
FIG. 2 is a top plan view of a portion of a first sub-pixel electrode according to one or more exemplary embodiments.

FIG. 2 is a top plan view of a portion of a first sub-pixel electrode 191a according to one or more exemplary embodiments.

Referring to FIG. 2, the first sub-region 191a1 of the first sub-pixel electrode 191a includes a cross-shaped connection portion located in a center portion of a pixel area, and a planar shape including four parallelograms disposed around the cross-shaped connection portion surrounding the cross-shaped connection portion. An extension portion 193 is disposed in a center of the cross-shaped connection portion. Also, the first sub-region 191a1 includes protrusions extending in two vertical directions from a horizontal central portion of the pixel area. As described above, the first sub-region 191a1 of the first sub-pixel electrode 191a is disposed in a portion of the pixel area.

Figure 3:
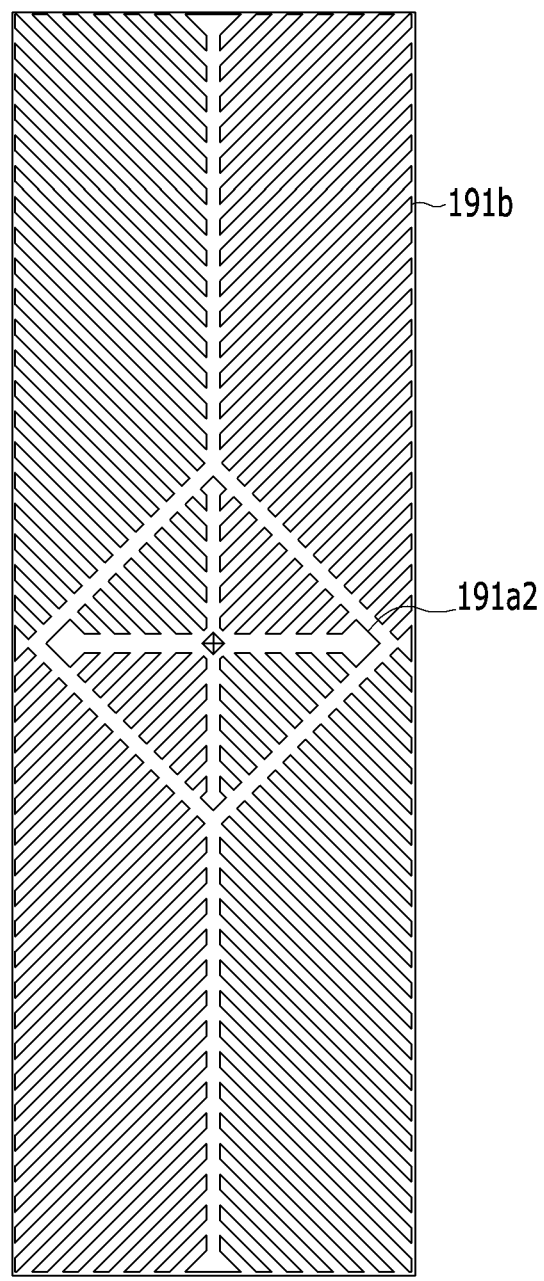
FIG. 3 is a top plan view of a first sub-pixel electrode and a second sub-pixel electrode according to one or more exemplary embodiments.

FIG. 3 is a top plan view of the first sub-pixel electrode 191a and the second sub-pixel electrode 191b according to one or more exemplary embodiments.

Referring to FIG. 3, a second sub-region 191a2 of the first sub-pixel electrode 191a is disposed in a center portion of the pixel and has an overall rhombus shape. The second sub-region 191a2 of the first sub-pixel electrode 191a includes a cross-shaped stem portion including a horizontal portion and a vertical portion, and a plurality of first branch electrodes extending from the cross-shaped stem portion. The plurality of first branch electrodes extends in four respective directions.

At least a portion of the second sub-pixel electrode 191b overlaps with the first sub-region 191a1 of the first sub-pixel electrode 191a. The portion of the second sub-pixel electrode 191b overlaps with the first sub-region 191a1 of the first sub-pixel electrode 191a with an insulating layer, in detail, a second insulating layer 240b, disposed therebetween. The second sub-pixel electrode 191b includes a plurality of second branch electrodes extending in the same direction as the first branch electrodes of the second sub-region 191a2 of the first sub-pixel electrode 191a.

A first contact hole 185a exposing a portion of the first drain electrode 175a and a second contact hole 185b exposing a portion of the second drain electrode 175b are formed in the passivation layer 180, the first insulating layer 240a, and the second insulating layer 240b. Also, a third contact hole 186 exposing the extension portion 193 of the first sub-pixel electrode 191a is formed in the second insulating layer 240b.

The first sub-region 191a1 of the first sub-pixel electrode 191a is physically and electrically connected to the first drain electrode 175a via the first contact hole 185a, and the second sub-pixel electrode 191b is physically and electrically connected to the second drain electrode 175b via the second contact hole 185b. Also, the second sub-region 191a2 of the first sub-pixel electrode 191a is connected to the extension portion 193 of the first sub-region 191a1 of the first sub-pixel electrode 191a via the third contact hole 186 formed in the second insulating layer 240b.

The first sub-pixel electrode 191a and the second sub-pixel electrode 191b respectively receive a data voltage from the first drain electrode 175a and the second drain electrode 175b through the first contact hole 185a and the second contact hole 185b.

The data voltage applied to the second sub-pixel electrode 191b is divided from the second drain electrode 175b via the third source electrode 173c, and therefore, the voltage applied to the second sub-pixel electrode 191b may be smaller than a voltage applied to the first sub-pixel electrode 191a.

The shielding electrode 199 is disposed to overlap the data line 171 and may particularly have a substantially identical or similar shape as a planar shape of the data line 171. The shielding electrode 199 is disposed on two sides of each pixel area corresponding to the data line 171. The shielding electrode 199 may be disposed as a single electrode for adjacent pixels, not separately for each pixel areas.

The shielding electrode 199 may be formed of a transparent conductive material including at least one of indium tin oxide (ITO), indium zinc oxide (IZO) and the like and/or a reflective metal including at least one of aluminum, silver, chromium and an alloy of aluminum, silver, and chromium. That is, the shielding electrode 199 may be formed of the same material as the first sub-region 191a1 of the first sub-pixel electrode 191a or different materials. The shielding electrode 199 and the first sub-region 191a1 of the first sub-pixel electrode 191a may be simultaneously formed using a single mask. That is, the shielding electrode 199 may be disposed in the same layer as the first sub-region 191a1 of the first sub-pixel electrode 191a.

When the same voltage as that applied to the common electrode 270 is applied to the shielding electrode 199, no electrical field is formed between the shielding electrode 199 and the common electrode 270, and liquid crystal molecules disposed between the shielding electrode 199 and the common electrode 270 are not aligned. Accordingly, the liquid crystals disposed between the shielding electrode 199 and the common electrode 270 are in a black state, and thus may function as a light shielding member.

Accordingly, the liquid crystal display device according to the exemplary embodiments may have a light shielding member including a light blocking member 500, which will be described later, in addition to shielding electrode 199.

Referring back to FIGS. 1, 4, 5, and 6, a first region R1, a second region R2, and a third region R3 included in a pixel area of the liquid crystal display device according to the exemplary embodiments will be described in detail.

Referring to FIGS. 1 and 4, in the first region R1 of the pixel area of the liquid crystal display device according to the exemplary embodiments, the second sub-region 191a2 of the first sub-pixel electrode 191a connected to the extension portion 193 of the first sub-region 191a1 of the first sub-pixel electrode 191a and the common electrode 270 are configured to generate an electrical field. Here, the second sub-region 191a2 of the first sub-pixel electrode 191a includes a cross-shaped stem portion and a plurality of branch electrodes extending in four different directions. The plurality of first branch electrodes may be inclined at about 40 degrees to about 45 degrees with respect to the gate line 121.

A fringe field generated at edges of the plurality of first branch electrodes may align the liquid crystal molecules of a liquid crystal layer 3 located in the first region R1 in four different directions. In detail, a horizontal component of the fringe field generated by the plurality of first branch electrodes are almost horizontal to sides of the plurality of first branch electrodes, and thus, the liquid crystal molecule are aligned in a direction parallel to a length direction of the plurality of first branch electrodes.

Referring to FIGS. 1 and 5, in the second region R2 of one pixel area of the liquid crystal display device according to the exemplary embodiments, the first sub-region 191a1 of the first sub-pixel electrode 191a and a portion of the second sub-pixel electrode 191b overlap each other. The liquid crystal molecules of the liquid crystal layer 3 are aligned by an electrical field formed between the portion of the second sub-pixel electrode 191b and the common electrode 270, an electrical field formed between the common electrode 270 and the first sub-region 191a1 of the sub-pixel electrode 191a disposed between a plurality of second branch electrodes of the second sub-pixel electrode 191b, and an electrical field formed between the portion of the second sub-pixel electrode 191b and the first sub-region 191a1 of the first sub-pixel electrode 191a.

Referring to FIGS. 1 and 6, in the third region R3 of one pixel area of the liquid crystal display device according to the exemplary embodiments, an electrical field is generated between the remaining regions of the second sub-pixel electrode 191b and the common electrode 270. As described above, a second voltage applied to the second sub-pixel electrode 191b is smaller than a first voltage applied to the first sub-pixel electrode 191a.

Thus, an intensity of an electrical field applied to a liquid crystal layer disposed in the first region R1 is the greatest, and an intensity of an electrical field applied to a liquid crystal layer disposed in the third region R3 is the smallest. Due to the electrical field generated by the first sub-pixel electrode 191a disposed under the second sub-pixel electrode 191b in the second region R2, an intensity of the electrical field applied to the liquid crystal layer disposed in the second region R2 may be smaller than the electrical field applied to the liquid crystal layer disposed in the first region R1, and be greater than the electrical field applied to the liquid crystal layer disposed in the third region R3.

As described above, the pixel area of the liquid crystal display device according to exemplary embodiments may be divided into the first region R1, in which the second sub-region 191a2 of the first sub-pixel electrode 191a, to which a relatively high first voltage is applied, is disposed, the second region R2, in which the first sub-region 191a1 of the first sub-pixel electrode 191a and the portion of the second sub-pixel electrode 191b, to which a relatively low second voltage is applied, are disposed with the insulating layer 240b disposed therebetween, and the third region R3, in which the remaining portions of the second sub-pixel electrode 191b, to which the relatively low second voltage is applied, are disposed.

Accordingly, the liquid crystal molecules may be aligned to have different tilt angles corresponding to the different intensities of the electrical fields applied to liquid crystal molecules disposed in the first region R1, the second region R2, and the third region R3, thus resulting in different luminance of the respective regions. As described above, by dividing one pixel area into three regions having difference luminances, a transmittance may be adjusted to change gradually according to grayscale, and an abrupt change in transmittance seen from a lateral side according to a grayscale change even at low grayscale and high grayscale may be reduced or prevented, thereby providing lateral viewability close to front side viewability and accurate grayscale expression at low grayscale and high grayscale.

Hereinafter, a method of driving the liquid crystal display device according to one or more exemplary embodiments will be briefly described.

A gate on signal is applied to the gate line 121, and the gate on signal is applied to the first gate electrode 124a, the second gate electrode 124b, and the third gate electrode 124c so that a first thin film transistor Qa, a second thin film transistor Qb, and a third thin film transistor Qc are respectively turned on. Accordingly, a data voltage applied to the data line 171 is applied to the first sub-pixel electrode 191a and the second sub-pixel electrode 191b through the first thin film transistor Qa and the second thin film transistor Qb that are turned on.

The data voltage is applied to the first sub-pixel electrode 191a and the second sub-pixel electrode 191b. However, the voltage applied to the second sub-pixel electrode 191b is divided by the thin film transistor Qc that is serially connected to the second thin film transistor Qb. Accordingly, the voltage applied to the second sub-pixel electrode 191b is smaller than the voltage applied to the first sub-pixel electrode 191a.

Referring to FIG. 2 again, one pixel area of the liquid crystal display device according to the exemplary embodiments includes the first region R1, in which the second sub-region 191a2 of the first sub-pixel electrode 191a is disposed, the second region R2, in which the portion of the first sub-region 191a1 of the first sub-pixel electrode 191a and the portion of the second sub-pixel electrode 191b overlap each other, and the third region R3, in which the remaining portions of the second sub-pixel electrode 191b are disposed.

Each of the first region R1, the second region R2, and the third region R3 may be respectively formed of four sub-regions.

An area of the second region R2 may be about twice an area of the first region R1, and an area of the third region R3 may be about twice the area of the second region R2.

FIG. 7 illustrates light blocking members disposed on the first substrate 110.

The first substrate 110 includes a plurality of light blocking regions and a display area. A region where the plurality of thin film transistors Qa, Qb, and Qc are formed may be referred to as a first light blocking region, and a portion of the data line 171 extending in a vertical direction Y may be referred to as a second light blocking region.

Referring to FIG. 7, the light blocking member 500 may extend in a horizontal direction X to cover the first light blocking region.

The shielding electrode 199 may extend in a vertical direction Y overlapping the second light blocking region. As described above, since same voltage is applied to the common electrode 270 and the shielding electrode 199, the liquid crystals disposed between the shielding electrode 199 and the common electrode 270, may be in the black state and thus, may function as a light shielding member as the light blocking member 500.

The shielding electrode 199 may be interposed between the data line 171 and the common electrode 270 to cover the data line 171.

According to the exemplary embodiment, the first color filter 410 may be a red color filter, and the second color filter 420 may be a blue color filter. As described above, colors of the color filters are not limited there to, and may be varied.

Respective boundary regions of the first color filter 410 and the second color filter 420 may be formed to overlap each other to form a color filter overlapping portion 430 in a vertical direction Y. (Refer to FIG. 9C)

Figure 8A:
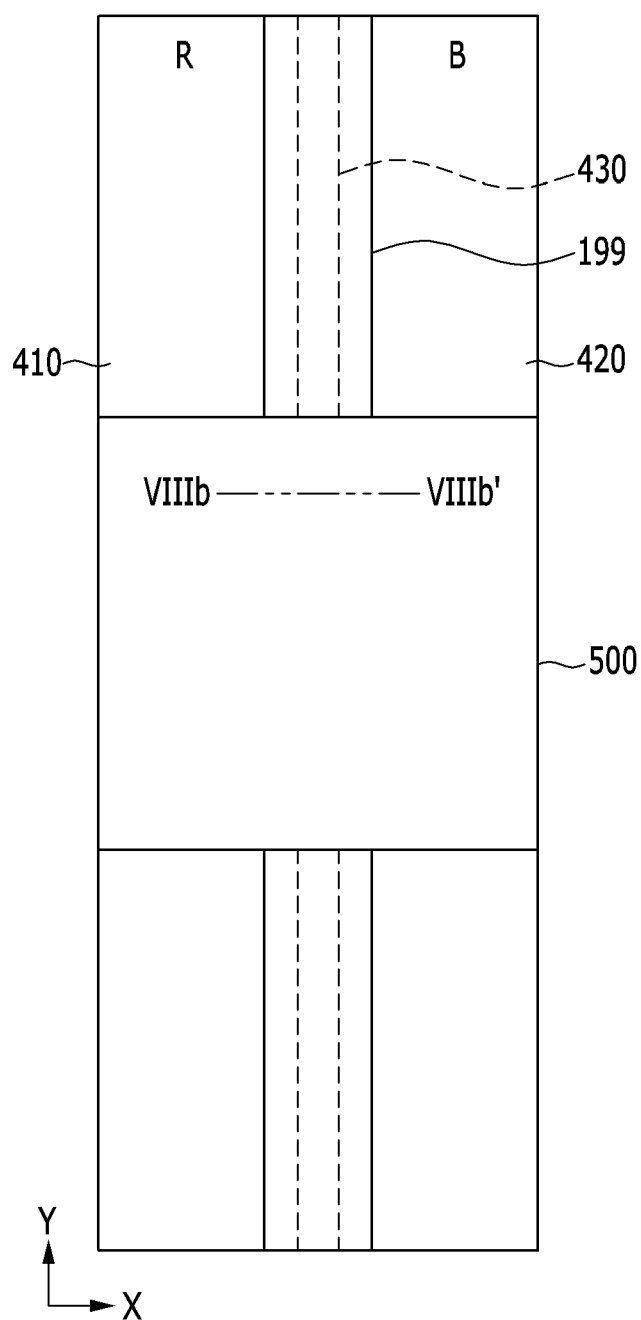
FIG. 8A is a planar view of a portion of a first substrate in which a first light blocking region and the second light blocking region overlaps, according to a comparative art.
Figure 8B:
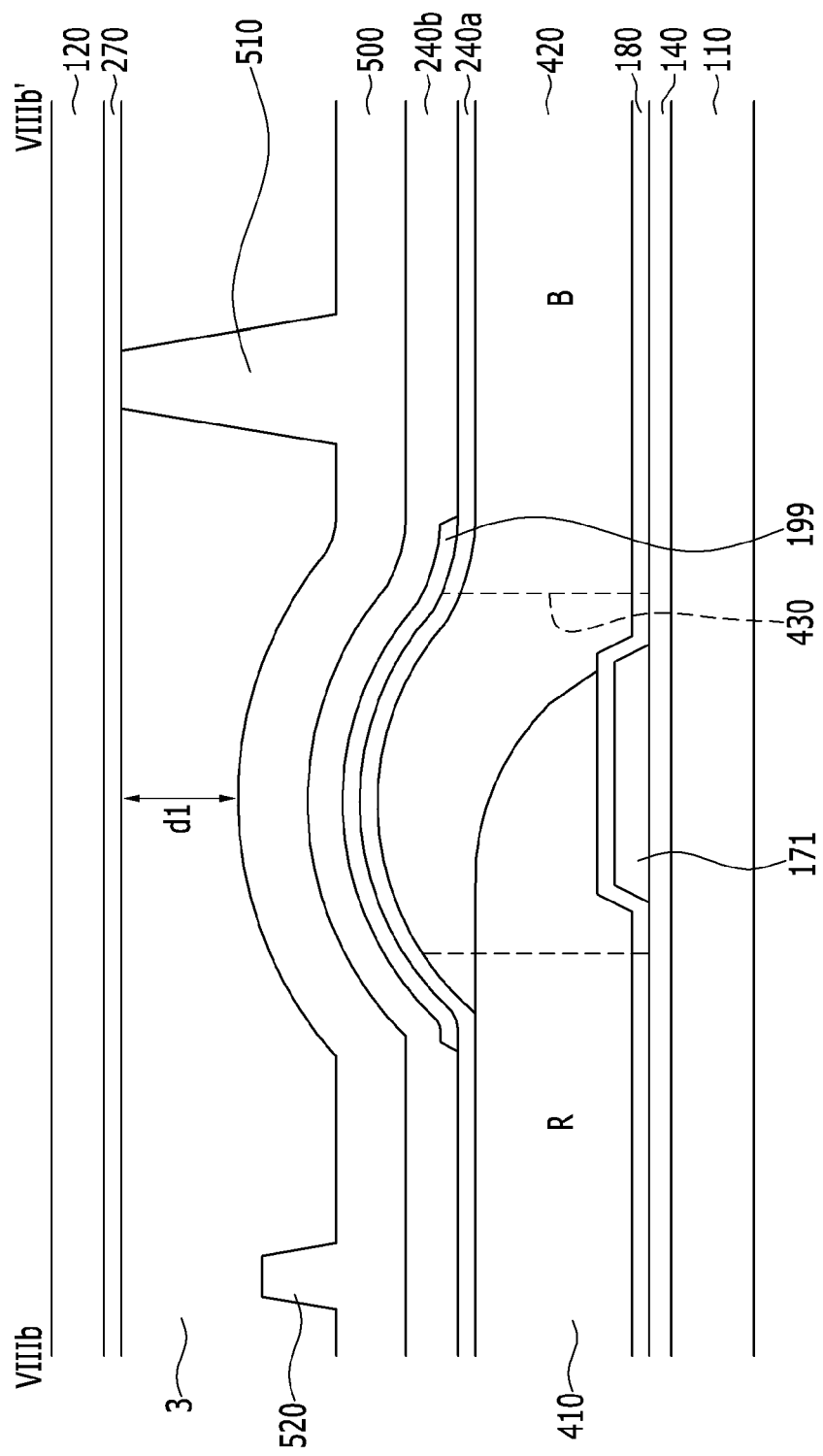
FIG. 8B is a cross-sectional view of the portion of the first substrate taken along a sectional line VIIIb-VIIIb' of FIG. 8A.

FIG. 8A is a planar view of a portion of a first substrate in which a first light blocking region and the second light blocking region overlaps, according to a comparative art, and FIG. 8B is a cross-sectional view of the portion of the first substrate taken along a sectional line VIIIb-VIIIb' of FIG. 8A. A sectional line VIIIb-VIIIb' of FIG. 8A may correspond with the sectional line IXc-IXc' of FIG. 7.

Referring to FIG. 8B, a triple-overlap portion, where the data line 171, the color filter overlapping portion 430, and the light blocking member 500 overlaps, having an overall height higher than or similar to a height of a second spacer 520 which is a sub-column spacer.

According to one or more exemplary embodiments, a data line for improving RC delay may have, but not limited to, a thickness of 7500 Å (for example, the data line may include a first layer including Molybdenum (Mo) having a thickness of 1000 Å, a second layer including Aluminum (Al) having a thickness of 6000 Å, and a third layer including Mo having a thickness of 500 Å), and the color filter overlapping portion 430 may generate a step of 1 µm for overlapping of 5 µm since a step of a 0.2 µm for each overlapping of 1 µm. Thus, a cell gap d1 of a corresponding portion may be considerably narrow, and this may irregularly affect a density of a first spacer 510 and the second spacer 520 which are main column spacers, as described above. Also, this may cause a problem in a liquid crystal margin at a low temperature.

Figure 9A:
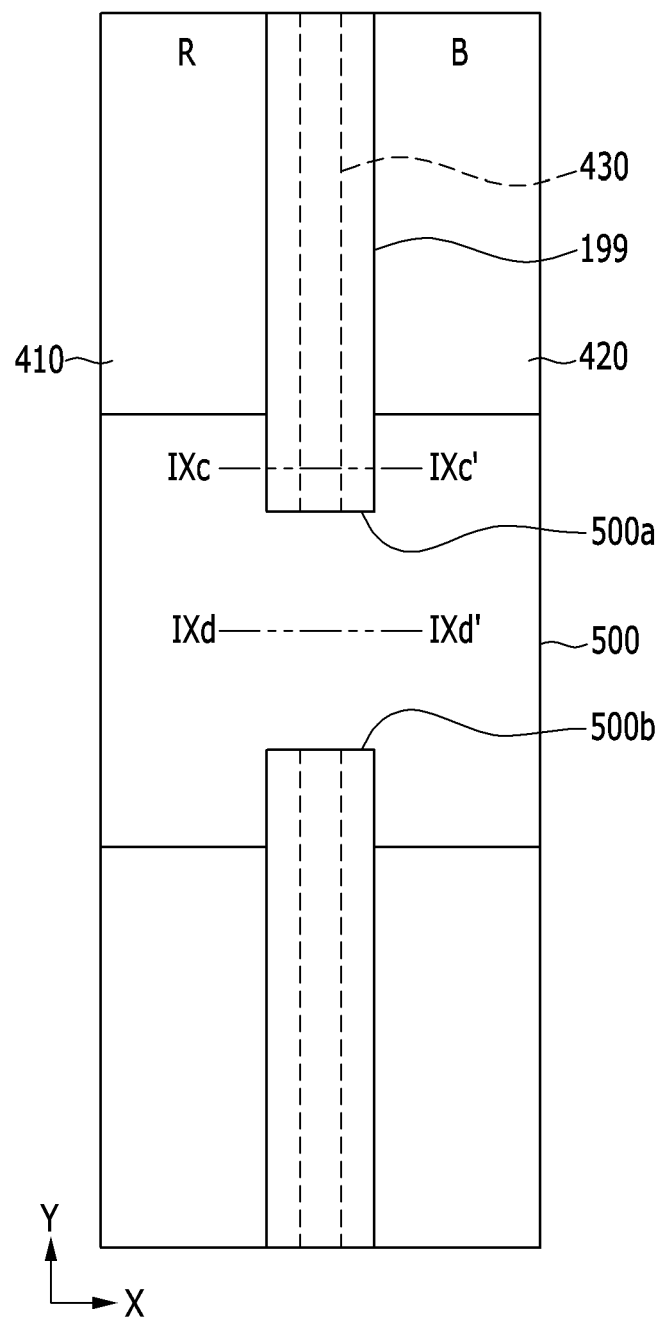
FIGS. 9A and 9B are planar views of a portion of a first substrate in which a first light blocking region and the second light blocking region overlaps, according to one or more exemplary embodiments.
Figure 9B:
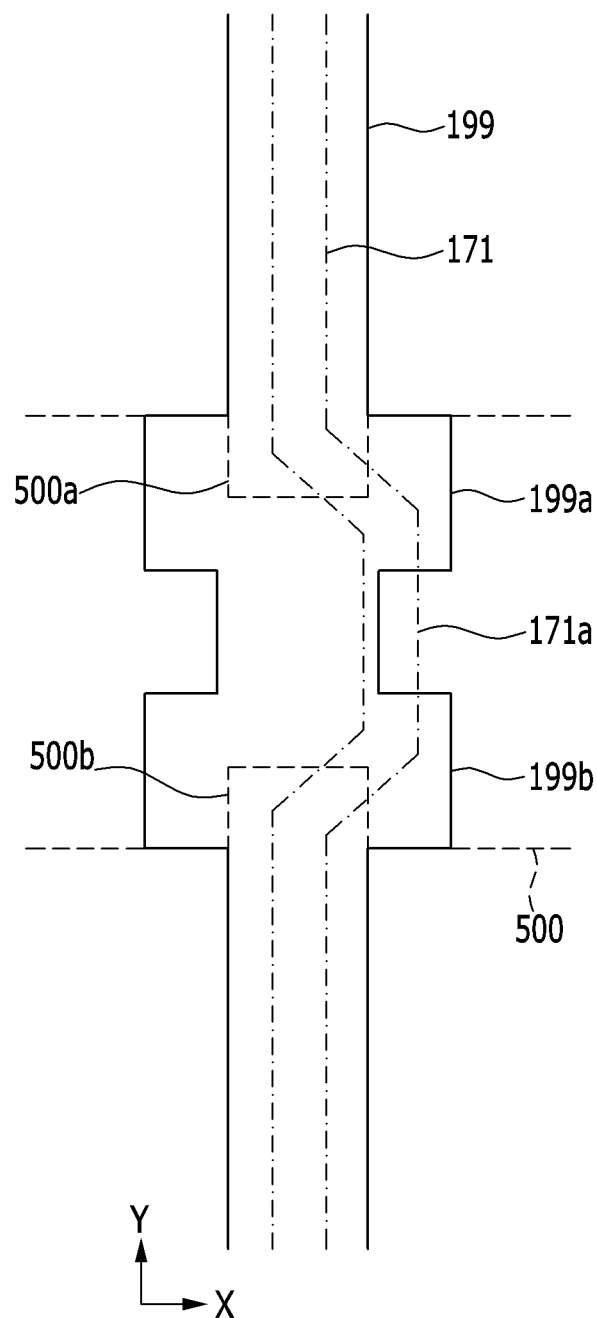
Figure 9C:
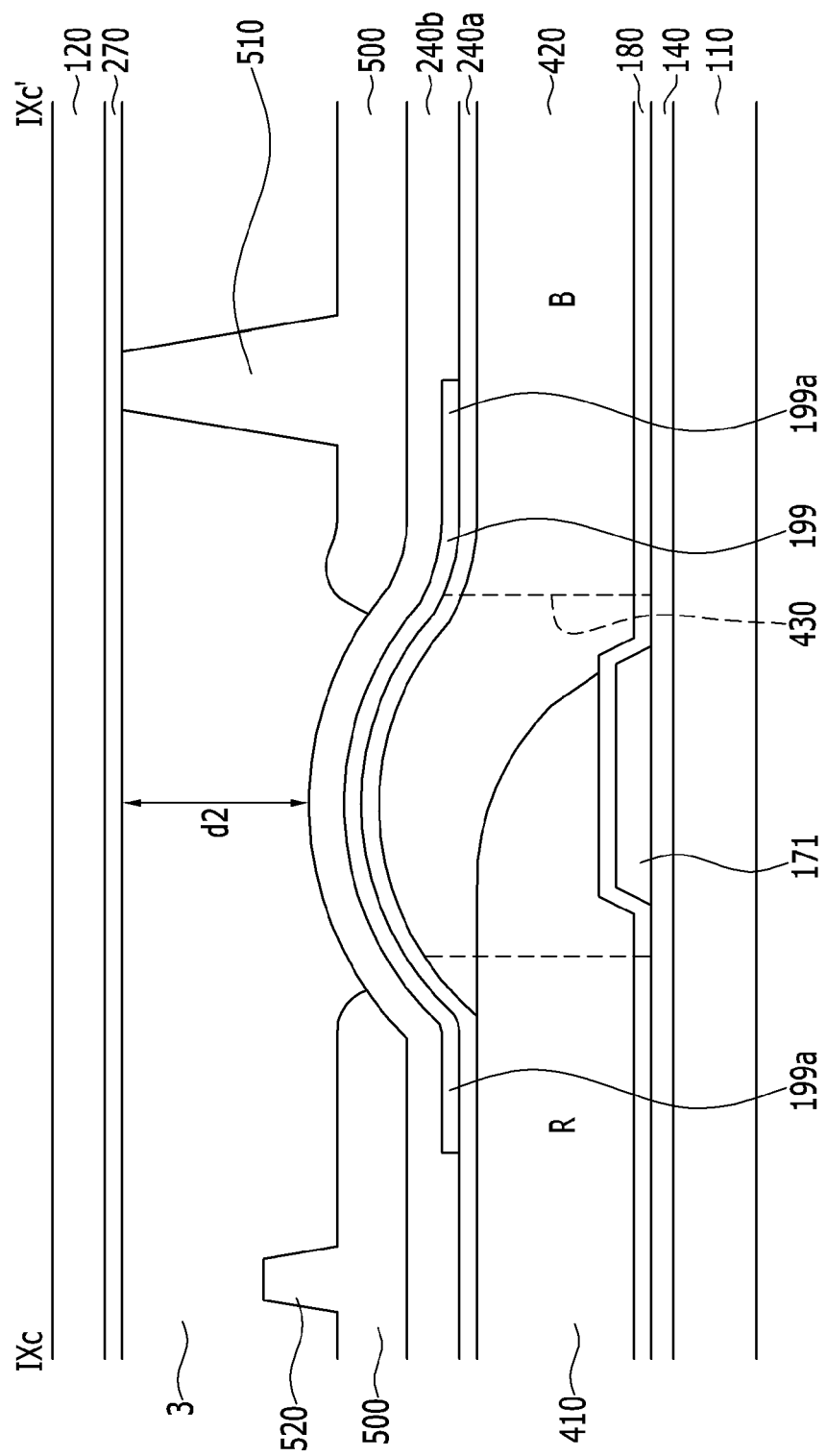
FIGS. 9C and 9D are cross-sectional views of the portion of the first substrate respectively taken along sectional lines IXc-IXc' and IXd-IXd' of FIGS. 7 and 9A.
Figure 9D:
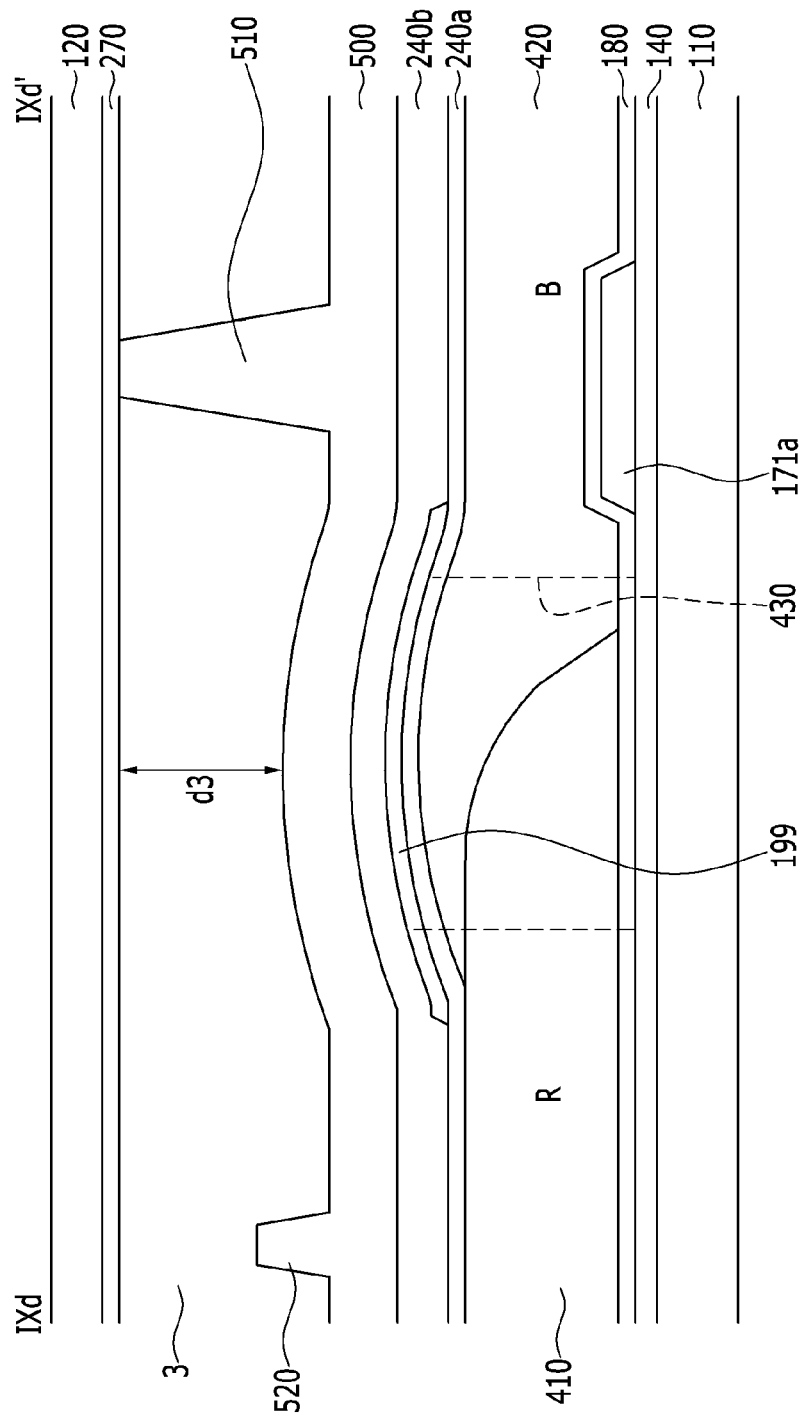

FIGS. 9A and B are planar views of a portion of a first substrate in which a first light blocking region and the second light blocking region overlaps, according to one or more exemplary embodiments, and FIGS. 9C and 9D are cross-sectional views of the portion of the first substrate respectively taken along sectional lines IXc-IXc' and IXd-IXd'.

Referring to FIG. 9A, the light blocking member 500 according to one or more exemplary embodiments may include a first opening 500a and a second opening 500b in a vertical direction Y in a region, in which the light blocking member 500 crosses the color filter overlapping portion 430.

Referring to FIG. 9B, the light blocking member 500 is denoted by a dashed line, a structure of the shielding electrode 199 is denoted by a solid line, and the data line 171 is denoted by a dash-dot line, according to the exemplary embodiments. In order to clearly describe the overlapping structure, a portion of the data line 171 extending to the first source electrode 173a is not illustrated, unlike FIG. 1.

Although not illustrated in FIG. 9B for structural clarity, the color filter overlapping portion 430 uniformly extends in a vertical direction Y as illustrated in FIG. 9A.

The shielding electrode 199 may include a first extension portion 199a corresponding to a region in which the first opening 500a is formed, and a second extension portion 199b corresponding to a region in which the second opening 500b is formed.

The first extension portion 199a and the second extension portion 199b of the shielding electrode 199 may reduce or prevent light leakage that may be caused by the light blocking member 500 including the first opening 500a and the second opening 500b.

The data line 171 may include a spacer portion 171a in a region where the first opening 500a and the second opening 500b are not formed. That is, the data line 171 extending uniformly in the vertical direction Y is curved in a region in which the first opening 500a and the second opening 500b are formed, in order to reduce or avoid triple overlapping with respect to the color filter portion 430 and the light blocking member 500. That is, the data line 171 extends by bending in the region in which the first opening 500a and the second opening 500b are formed.

Thus, the data line 171 and the color filter overlapping portion 430 are spaced apart from each other at the spacer portion 171a in a horizontal direction X in the region where the first opening 500a and the second opening 500b are not formed.

As a result, referring to FIG. 9C, the color filter overlapping portion 430 and the data line 171 are double-overlapped in the region in which the first opening 500a and the second opening 500b are formed, and triple overlapping is not generated. Accordingly, a sufficient cell gap d2 may be formed, and the density of the spacers is not adversely affected.

Also, referring to FIG. 9D, in the region in which the first opening 500a and the second opening 500b are not formed, the data line 171 and the light blocking member 500 are double-overlapped, and the color filter overlapping portion 430 and the light blocking member 500 are double-overlapped, and triple overlapping may be reduced or avoided. That is, in a region where the light blocking member 500 is formed (region where an opening is not formed), the data line 171 and the color filter overlapping portion 430 are spaced apart from each other in a horizontal direction X, and thus, the data line 171 and the color filter overlapping portion 430 do not overlap each other to avoid triple overlapping. Accordingly, as a sufficient cell gap d3 is formed, the density of the spacers is not affected.

The first spacer 510 and the second spacer 520 may be integrally formed with each other of the same material as the light blocking member 500. The first spacer 510 and the second spacer 520 may be formed using a two-tone mask, including a halftone mask and/or a slit mask.

For example, when forming the light blocking member 500 using, for example, a negative photoresist, the mask may have a light transmittance of 100% in a region in which the first spacer 510 is to be formed, a light transmittance of 30% in a region in which the second spacer 520 is to be formed, and a light transmittance of 10% in the other regions. After a photo process, the first spacer 510 may be formed at an unetched position, and the second spacer 520 may be formed at a partially etched position, and the light blocking member 500 having a lower height may be formed in the other remaining regions.

A liquid crystal display device according to exemplary embodiments may reduce or prevent light leakage and provide column spacers having a uniform density.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A liquid crystal display device, comprising:
a first substrate comprising a first light blocking region, wherein a plurality of transistors are formed in the first light blocking region;
a second substrate facing the first substrate, the second substrate comprising a common electrode disposed thereon; and
a liquid crystal layer interposed between the first substrate and the second substrate, wherein the first substrate comprises:
a data line disposed extending in a vertical direction;
color filters, each of the color filters overlapping adjacent color filters to form a color filter overlapping portion in boundary regions of the color filters in the vertical direction; and
a light blocking member disposed extending in a horizontal direction covering the first light blocking region, wherein the data line and the color filter overlapping portion are spaced apart from each other in the horizontal direction in a region where the light blocking member is formed, and
wherein the light blocking member comprises an opening in the vertical direction in a region where the light blocking member crosses the color filter overlapping portion.

2. The liquid crystal display device of claim 1, wherein the first substrate further comprises a shielding electrode disposed extending in the vertical direction to form a second light blocking region.

3. The liquid crystal display device of claim 2, wherein the shielding electrode is interposed between the data line and the common electrode.

4. The liquid crystal display device of claim 3, wherein:
the shielding electrode comprises an extension portion corresponding to the region where the opening is formed.

5. The liquid crystal display device of claim 4, further comprising:
a first spacer disposed on the light blocking member, the first spacer supporting the first substrate and the second substrate; and
a second spacer disposed on the light blocking member, the second spacer having a lower height than that of the first spacer,
wherein an overall height of the first substrate comprising the light blocking member is lower than a height of the second spacer.

6. The liquid crystal display device of claim 5, wherein the first spacer, the second spacer, and the light blocking member are formed of the same material.

7. The liquid crystal display device of claim 1, wherein the data line and the color filter overlapping portion overlap each other in a region where the opening is formed.

8. The liquid crystal display device of claim 7, wherein the data line is curved in the region where the opening is formed.

9. The liquid crystal display device of claim 8, wherein the data line comprises a spacer portion in a region where the light blocking member is formed and the opening is not formed.

* * * * *